Feb. 4, 1969     P. A. MUTCHLER     3,425,634

MULTIFUEL BURNER NOZZLE

Filed July 20, 1966

INVENTOR.
Paul A. Mutchler
BY Edward M. Steutermann

United States Patent Office 3,425,634
Patented Feb. 4, 1969

3,425,634
MULTIFUEL BURNER NOZZLE
Paul A. Mutchler, St. Louis, Mo., assignor to American Air Filter Company, Inc., Louisville, Ky., a corporation of Delaware
Filed July 20, 1966, Ser. No. 566,576
U.S. Cl. 239—405     2 Claims
Int. Cl. B05b 7/10

ABSTRACT OF THE DISCLOSURE

A fuel nozzle assembly for a burner which provides a sleeve to receive a fuel feed tube so an annular area is defined between the tube and the sleeve and includes means to provide a stream of air through the annular area to control the temperature of the fuel feed tube and the fuel flowing through the tube where the cross-sectional area of the flow passage through the tube is uniform and is no greater than the cross-sectional area of the nozzle through which the fuel is emitted into the burner.

---

Previous fuel nozzle arrangements have been designed to provide certain operating characteristics for specific fuels at selected temperatures. Most such previous fuel nozzles operate satisfactorily when used to burn specific fuels but have not been capable of satisfactorily burning both highly volatile fuel and less volatile fuel without modification of the nozzle.

In one type of nozzle, namely fuel aspirating nozzles, fuel is forced through a very small outlet in the nozzle and is intimately mixed with a stream of high velocity air to atomize the fuel entering the burner. The fuel orifice and air mixing means in such fuel aspirating nozzles must be rigidly held in cooperatively associated relation; therefore, such nozzles are very carefully machined and are quite heavy. After such heavy nozzles have operated for a long period of time the nozzle becomes hot from heat gained from the combustion occurring adjacent the nozzle and erratic burner operation results when the heat is conducted to the fuel passing through the nozzle and vaporizes the fuel in the nozzle.

More partciularly, the new and advantageous fuel spraying nozzle in accordance with applicant's invention provides an arrangement to spray a metered quantity of fuel from the nozzle regardless of the relative volatility of the fuel or of the length of time the burner has been operating. Furthermore, the fuel nozzle in accordance with applicant's invention provides means to cooperatively and rigidly align the fuel orifice and air mixing means of a fuel aspirating nozzle to maintain a low temperature in the nozzle and the conduit leading to the fuel nozzle, prevent vaporization of highly volatile fuels, and provide a fuel aspirating nozzle capable of burning both highly volatile fuels and less volatile fuels.

Various other features of the present invention will become obvious to one skilled in the art upon reading the disclosure set forth hereinafter.

More particularly, the present invention provides:

A tubular nozzle holding sleeve having an inlet end, an outlet end, and air conducting aperture means extending radially through the wall of the sleeve adjacent the outlet end;

Fuel nozzle means, having at least one fuel emitting aperture, disposed in the sleeve outlet;

A fuel feeding tube having a passage of cross-sectional area substantially the same as the cross-sectional area of the fuel emitting aperture of the fuel nozzle, the fuel tube being connected with the fuel nozzle so the passage of the fuel tube and the fuel emitting aperture of the fuel nozzle are in communicative relation, means to dispose the tube to extend longitudinally through the central passage of the sleeve to form a first annular chamber between the fuel tube and the sleeve so the first annular chamber is in communicative relation with the aperture means in the sleeve; fuel supply means to provide fuel to the fuel tube at selected pressure; hollow cap means having a central chamber of diameter greater than the outlet end of the sleeve, and having a fuel-air outlet aperture; means to dispose the outlet end of the sleeve within the hollow cap means to form a second annular chamber between the sleeve and the cap chamber so the air conducting aperture of the sleeve means communicates with the second chamber and the fuel nozzle aperture communicates with the fuel-air outlet aperture of the cap; means to supply air to the first annular chamber so air flows through the first annular chamber and is emitted through the radially extending apertures in the sleeve to the second chamber; and, means to direct air from the second chamber toward the aperture in the fuel nozzle so the air and fuel are mixed and the mixture passes through the fuel-air aperture of the cap.

It is to be understood that various changes can be made in the arrangement, form, or construction of the fuel nozzle arrangement disclosed herein without departing from the scope or spirit of the present invention.

Figure 1:
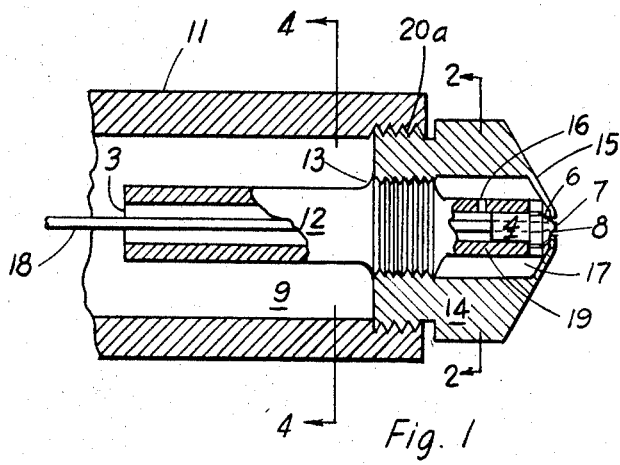
FIG. 1 is a view, in section, of a fuel nozzle arrangement in accordance with the present invention.

One example of a multifuel nozzle in accordance with the present invention, as shown in FIG. 1, could be mounted in a tubular holder 11 adapted to receive a nozzle cap 14 which holds a sleeve 12 in centrally disposed relation within the tube 11. A fuel supply tube 18 is centrally disposed in the passage in sleeve 12 and has one end connected to fuel supply means (not shown) and an outlet end communicating with fuel nozzle 4 which is adapted to be received by the outlet end of sleeve 12. Multifuel nozzle arrangements in accordance with the present invention can be adapted for use in a variety of fuel burning devices and can include support means (not shown) to hold such fuel nozzles to provide fuel to cooperatively associated burning devices.

Figures 2, 3:
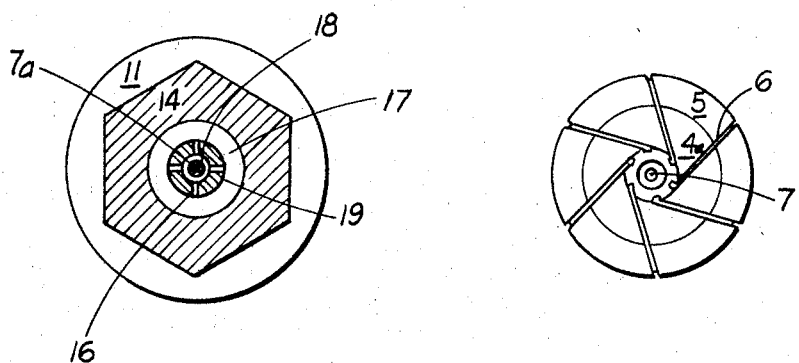
FIG. 2 is a view taken along a plane passing through line 2—2 of FIG. 1.
FIG. 3 is an end view of a fuel orifice of FIG. 1.

More particularly, sleeve 12, as shown in FIGURES 1 and 2, includes an enlarged threaded portion 13 intermediate the ends of the sleeve so the threaded portion 13 is cooperatively received by the internally threaded portion 13a of nozzle cap 14, hereinafter described. In accordance with the present invention, sleeve 12 advantageously includes a series of radially directed apertures 16 adjacent the outlet end of sleeve 12 (FIGS. 1 and 2) to permit passage of air from the inside of sleeve 12 as hereinafter described.

Sleeve 12 is adapted to receive nozzle means to atomize or break up the fuel stream provided through tube 18, and in the example of FIGURE 1, sleeve 12 is adapted to receive an air aspirating fuel nozzle 4 as manufactured and sold by Delavan Company of West Des Moines, Iowa.

Nozzle 4 includes an outlet orifice 7 (FIGURES 1 and 3) and an enlarged tip including a frusto-conical surface 5 and a planar surface 4a. Surfaces 4a and 5 are cooperatively adapted to be urged against the inside surface of wall 15 of nozzle cap 14 (hereinafter described) by nozzle holder 2 when the nozzle arrangement is assembled.

Figure 4:
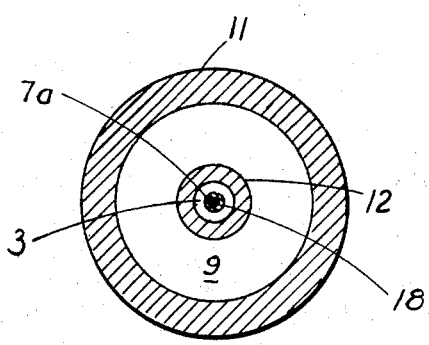
FIG. 4 is a view taken along a plane passing through line 4—4 of FIG. 1.

It will be noted in FIGURES 1 and 3 that air conducting slots 6 are cut across frusto-conical surface 5 and planar surface 4a of nozzle 4 to direct high velocity streams of air to fuel emitting aperture 7. By virtue of the position of slots 6, air emitted from slots 6 is directed toward aperture 7 in a swirling pattern to break up and atomize the stream of fuel emitted from orifice 7 and from a combustible fuel-air mixture which is sprayed through outlet 8 of cap 14 to the associated burner. Fuel tube 18 is advantageously, a thin walled tube having a central passage 7a and is made of a material having a high coefficient of thermal conductivity for example copper. Tube 18 extends through the passage in sleeve 12 so a first annular chamber 3 is formed between tube 18 and sleeve 12 (FIG. 4). Tube 18 is connected to nozzle 4 in communicative relation, for example by force fit or welding, and receives fuel from a source (not shown) so fuel is provided through passage 7a of tube 18 to orifice 7. In accordance with the present invention, the cross-sectional area of passage 7a through fuel tube 18 is approximately the same as the cross-sectional area of outlet 7 of fuel nozzle 4 so the residence time in tube 18 is a minimum.

Nozzle cap 14 which receives the threaded portion 13 of sleeve 12 includes an internal chamber having internal threads 13a adapted to receive threaded portion 13 of sleeve 12. The chamber of cap 14 is adapted to receive the outlet end of sleeve 12 when the arrangement is assembled so nozzle 4 is urged against the inside of wall 15 of cap 14 and a second annular chamber 17 (FIGURES 1 and 2) is formed between end 19 of holder 2 and the wall of said chamber of cup 14. Wall 15 further includes an outlet 8 disposed to communicate with aperture 7 and air conduits 6 of nozzle 4 to mix the fuel and air to form a spray which is emitted from aperture 8 to the fuel burning device. It will be noted that in the example of the figures cap 14 has an external threaded portion 20 adapted to be received by internal threads 20a of conduit 11 so cap 20 is held in conduit 11 to position sleeve 12 centrally in conduit 11 and form an annular chamber 9 between sleeve 12 and conduit 11 (FIG. 4).

Fuel is provided to nozzle 4 through fuel feeding line 18 as hereinbefore described.

Air is supplied to conduit 11 to flow through annular chamber 3 where the air passing through chamber 3 and along fuel line 18 removes heat from tubular sleeve 12, fuel tube 18, and nozzle 4 to cool the fuel and prevent vaporization before emission from aperture 7. Air is emitted from chamber 3 through radially extending apertures 16 of tubular holder 12 and passes to chamber 17. The stream of air then passes through slots 6 of nozzle 4 to be mixed with fuel from outlet 7 and atomize the fuel to form an atomized fuel-air spray mixture which is emitted through outlet 8 of nozzle cap 15.

In accordance with the present invention, the cross-sectional area of the internal passage of fuel tube 18 is approximately the same as the cross-sectional area of outlet 7 of nozzle 4, so the fuel passes rapidly through tube 18 and does not remain in the tube long enough to absorb sufficient heat from the tube or the nozzle tip to cause vaporization of the fuel. Furthermore, air supplied to the fuel nozzle tip is used to cool the elements of the fuel nozzle, particularly the fuel tube, to remove heat from the nozzle arrangement.

The invention claimed is:

1. A multifuel nozzle comprising: tubular sleeve means having an inlet end, an outlet end, and air conducting aperture means extending radially through the wall of said sleeve adjacent said outlet end; liquid fuel nozzle means to be received by the outlet end of said sleeve means having at least one liquid fuel emitting aperture in an outlet end thereof with grooves extending generally radially across the surface of the outlet end of said nozzle from the edge of said nozzle to said aperture; a fuel feeding tube having a passage of cross-sectional area substantially the same as the cross-sectional area of said aperture of said fuel nozzle, said fuel tube being connected with said fuel nozzle so said fuel emitting aperture of said fuel nozzle means and said passage of said fuel tube are in communicative relation, said tube extending longitudinally through the central passage of said sleeve where the cross-sectional area of said passage is uniform along the portion of said tube received by said sleeve and so a first annular chamber is defined between said fuel tube and said sleeve and said first annular chamber is in communicative relation with said radially extending air conducting aperture means in said sleeve; fuel supply means to provide liquid fuel to said fuel tube at selected pressure; hollow cap means having a central aperture to receive said outlet end of said sleeve and said nozzle and a fuel air outlet aperture disposed to be in communicative relation with said outlet aperture of said nozzle means; means to dispose said outlet end of said sleeve and said nozzle means within said hollow cap means to form a second annular chamber between said sleeve and said cap means so said air conducting aperture means adjacent said sleeve outlet communicates with said second chamber; means to dispose said fuel nozzle in said cap means so said outlet end of said nozzle abuts the inner surface of said central chamber of said hollow cap means adjacent the fuel-air outlet aperture so said groove means in said outlet end of said nozzle are in communicative relation with said second chamber and said fuel air outlet aperture of said hollow cap means; and, means to supply air to said first annular chamber so air flow through said first annular chamber emitted through said aperture means in said sleeve means to said second chamber and through said groove means to said fuel-air outlet aperture means to be directed into fuel spray emanating from said fuel nozzle.

2. A multifuel nozzle for a fuel burning device comprising: a sleeve having an inlet end, an outlet end, a radially enlarged threaded portion intermediate the ends of said sleeve, and at least one radially extending aperture located between said threaded portion and said outlet end; a fuel nozzle to be received by the outlet end of said sleeve means having enlarged frusto-conical outlet end and a fuel outlet aperture in said outlet end with grooves extending across the frusto-conical surface of the outlet end from the edge of the outlet end to the fuel emitting aperture; fuel tube means extending longitudinally through said sleeve, said fuel tube having a central passage of cross-sectional area generally equal to the cross-sectional area of said fuel emitting aperture of said fuel nozzle, said fuel tube being connected to said fuel nozzle so said aperture in said fuel nozzle is in communicative relation with said passage in said fuel tube, said tube being disposed to extend longitudinally through the passage in said sleeve where the cross-sectional area of said passage is uniform through the portion of said tube received by said sleeve and a first annular chamber is defined between said fuel tube and said sleeve wherein said first chamber is in communicative relation within said radially etxending aperture in said sleeve; fuel means to supply liquid fuel to said fuel line at selected pressure; a hollow nozzle cap having a central chamber to receive said outlet end of said sleeve and a fuel-air outlet aperture disposed to be in communicative relation with said fuel outlet aperture of said nozzle, said cap including an internally threaded portion, sized to cooperatively receive said threaded portion of said sleeve to dispose said outlet of said sleeve and said nozzle means to form a second annular chamber between said sleeve means and said cap means so said radially extending apertures communicate with said second annular chamber and wherein said frusto-conical surface of said outlet end of said nozzle abuts the inner surface of said central chamber of said hollow cap means adjacent said fuel-air outlet so said groove means form conduits with said cap means and said conduit means are in communication with said second chamber and with said fuel-air outlet aperture of said cap means; and, means to provide air flow through said first chamber to cool said fuel line where said air flows through said radially extending aperture means to said second chamber and through said groove means to be directed toward said fuel outlet of said nozzle to mix with fuel emitted from said nozzle and is emitted through said fuel air outlet aperture of said cap means.

References Cited

UNITED STATES PATENTS

| 2,948,478 | 8/1960 | Walsh | 239—405 |
| 3,076,607 | 2/1963 | Cordier | 239—405 X |
| 3,163,362 | 12/1964 | McFee | 239—405 X |

STANLEY H. TOLLBERG, *Primary Examiner.*